United States Patent [19]
Sabo

[11] Patent Number: 5,806,702
[45] Date of Patent: Sep. 15, 1998

[54] RIBBED STORAGE TANK

[75] Inventor: Stephen A. Sabo, South Bend, Ind.

[73] Assignee: A.K. Industries, Inc., Plymouth, Ind.

[21] Appl. No.: 908,840

[22] Filed: Aug. 8, 1997

[51] Int. Cl.$^6$ ................................................. B65D 25/00
[52] U.S. Cl. ........................ 220/4.12; 220/4.13; 220/565
[58] Field of Search .................................... 220/565, 673, 220/4.12, 4.13

[56] References Cited

U.S. PATENT DOCUMENTS

| | | | |
|---|---|---|---|
| 4,257,527 | 3/1981 | Snyder et al. | 220/673 X |
| 4,553,561 | 11/1985 | Morris | 220/4.13 X |
| 4,715,513 | 12/1987 | Shelton, Jr. | 220/4.12 X |
| 4,718,208 | 1/1988 | Fons | 220/565 X |
| 5,017,044 | 5/1991 | Sharp | 220/4.12 X |

Primary Examiner—Steven M. Pollard
Attorney, Agent, or Firm—Baker & Daniels

[57] ABSTRACT

An underground storage tank for use for wastewater storage or as a temporary holding tank for wastewater or runoff from drainage systems. The present holding tank includes a generally cylindrical sidewall having a plurality of integrally molded longitudinal and annular reinforcing ribs spaced circumferentially about the sidewall. The ribs greatly strengthen the sidewall against the crushing forces of hydrostatic pressure, and thus the present tank can be constructed from polyethylene. The bottom of the tank terminates in a tapered portion having a plurality of integrally molded reinforced support posts, each of which terminates in a ground support pad. A raised anti-flotation annular collar separates the tapered portion from the main body of the tank and prevents the tank from being lifted by hydrostatic pressure.

33 Claims, 5 Drawing Sheets

RIBBED STORAGE TANK

BACKGROUND AND SUMMARY OF THE INVENTION

Most sewage treatment systems, storm water collection systems, and other drainage systems have a number of drainage pipes that transport liquids such as liquid waste, storm water or other fluids to a number of storage basins or lift stations spaced intermittently throughout the system. These storage basins or lift stations are typically buried underground, and include an opening having a removable access cover to provide access to the interior of the storage tank and to any internal mechanical equipment such as pumps, filters, couplings, fittings, etc. Such storage tanks or basins typically include an input pipe for routing the fluids into the basin and an output pipe for routing the fluids out. Typically, fluid from the system is routed into the storage basin and then pumped out after the level of fluid within the basin has reached a predetermined level. Because the storage tanks may be empty or nearly empty for extended periods, such tanks must be strong enough to withstand the crushing forces of hydrostatic pressure.

The present invention provides a liquid storage basin or tank having a plurality of annular reinforcing ribs which strengthen the wall of the storage tank against the crushing forces of hydrostatic pressure. The present storage basin also includes a raised annular collar adjacent the bottom end of the tank which serves as an anti-flotation device, thus preventing the hydrostatic forces from slowly lifting the storage tank out of the ground. The horizontally disposed reinforcing ribs are integrally formed in the tank's sidewall, and have a channel shaped cross section which, in addition to providing strength, also provide additional resistance to floating. The horizontally disposed reinforcing ribs and the tank side wall further cooperate to define a number of vertically oriented or longitudinal reinforcing ribs, which provide both strength against crushing and which also provide a generally flat attachment surface for pipe fittings, couplings, and other internal mechanical equipment. Together, the horizontal and vertical ribs and the annular collar greatly increase the strength of the tank. Accordingly, the tank can be constructed of polyethylene or similar materials rather than more expensive fiberglass or metal. Moreover, the integral reinforcement eliminates the need for internal or external reinforcement.

The bottom portion or base of the tank includes a tapered, generally conical portion which terminates in a generally flat, truncated surface. The tapered base includes a plurality of reinforcing ribs or sections which greatly strengthen the bottom portion of the tank against horizontal and vertical crushing forces. The shape of the tapered base also provides a nesting area for an internal subfloor which mounted inside the tank and which provides a mounting surface for pumps, gages, and other mechanical equipment. The internal subfloor allows internal equipment to be securely mounted without the use of mounting bolts which penetrate the tank wall, thus eliminating a potential source of leakage.

Accordingly, it is an object of this invention to provide an improved underground storage tank.

It is another object of this invention to provide an improved molded storage tank that has integral reinforcing ribs to resist crushing forces.

A further object of this invention is to provide an underground storage tank constructed of polyethylene.

These and other objects of this invention will become readily apparent to those skilled in the art upon a reading of the following description.

DETAILED DESCRIPTION OF THE INVENTION

Figure 1:
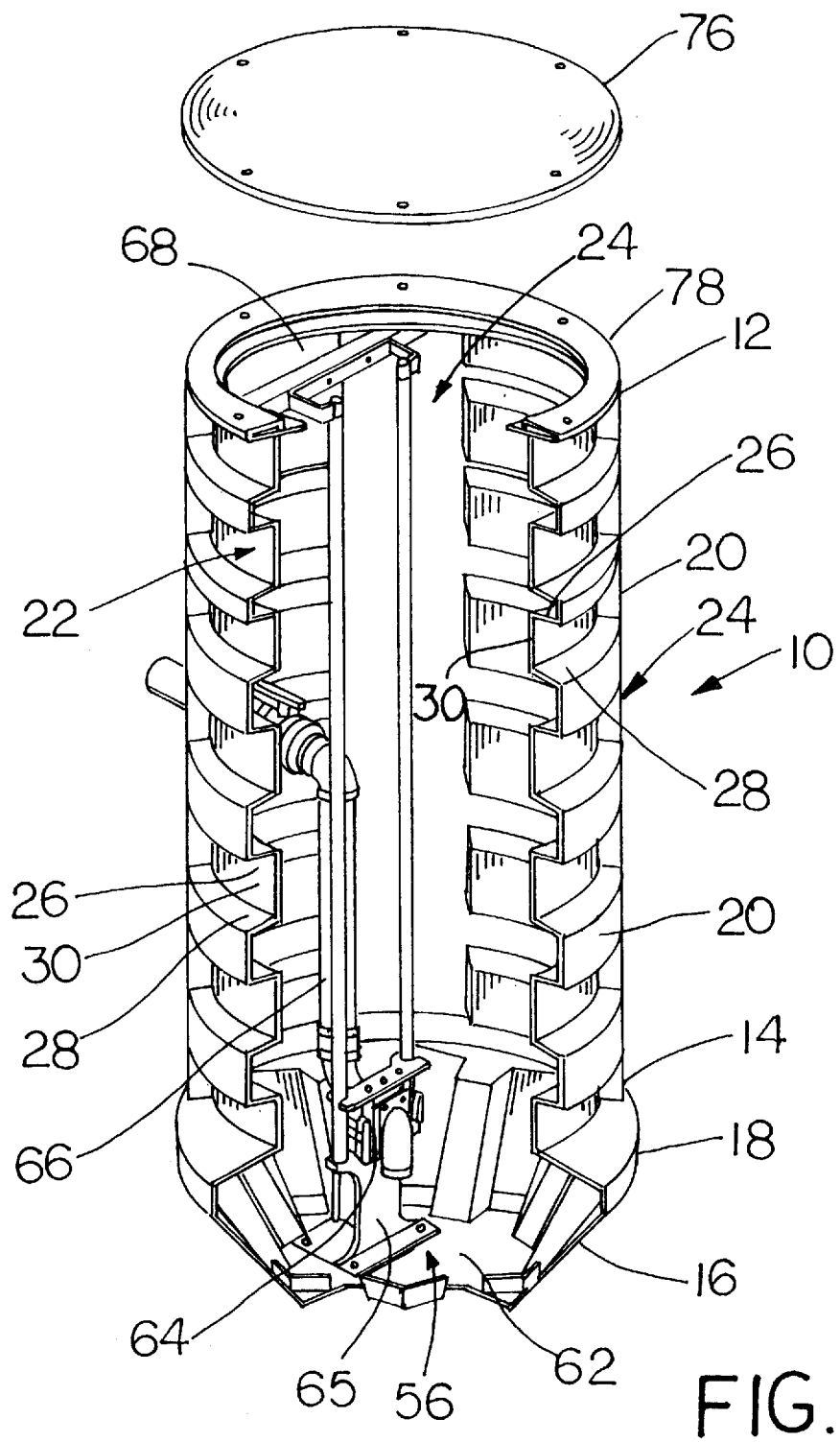
FIG. 1 is a fragmentary view in perspective of the ribbed underground storage tank according to the present invention; a portion of the sidewall has been cut away to reveal the internal floor insert, a discharge conduit, and other accessories.
Figure 2:
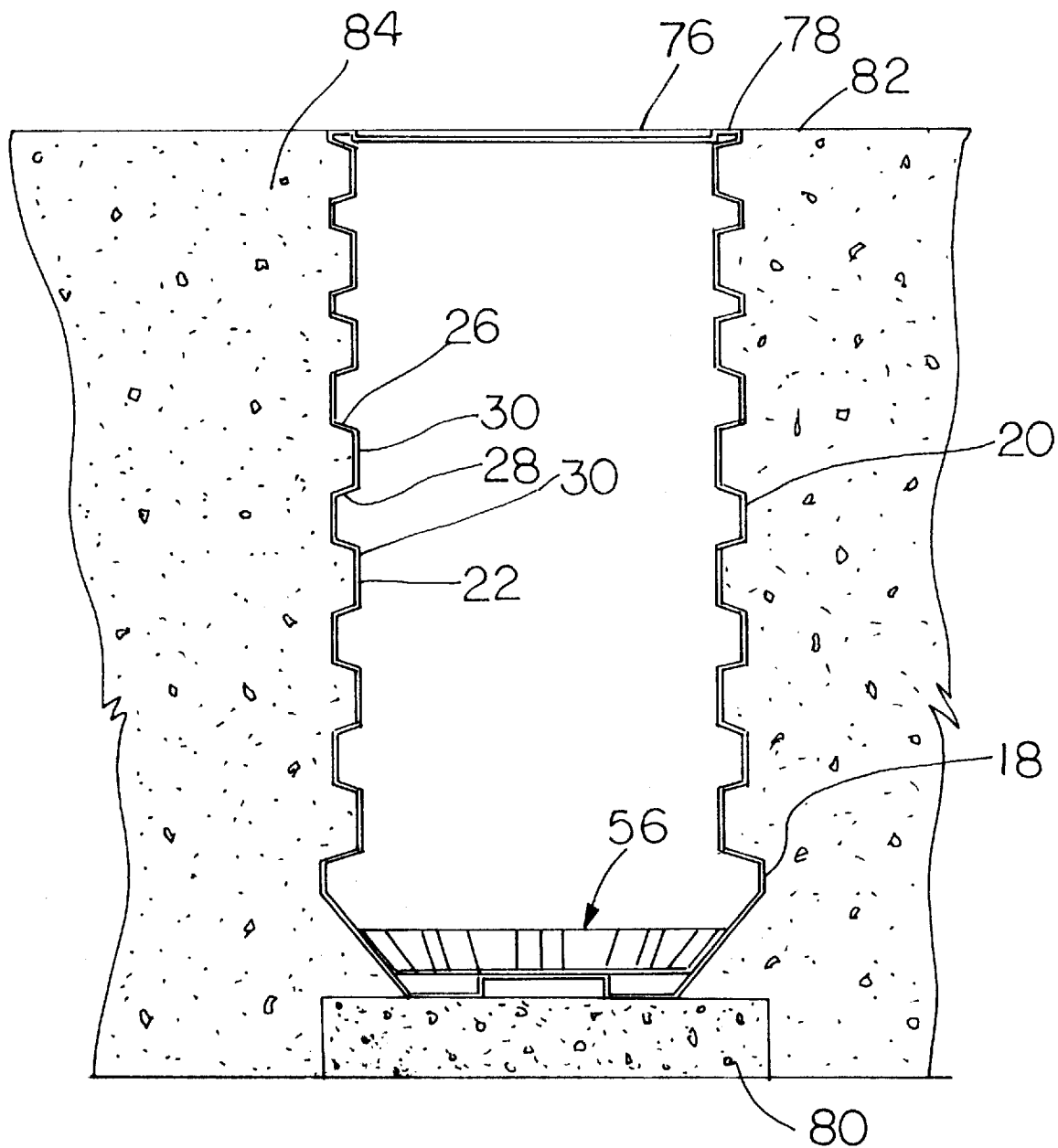
FIG. 2 is cross-sectional of the present ribbed storage tank shown supported on a concrete base and surrounded by dirt, gravel, or other backfill.

The embodiment herein described is not intended to be exhaustive or to limit the invention to the precise form disclosed. The embodiment described in detail below has been chosen and described to explain the principles of the invention and its application and practical use in order to best enable others skilled in the art to follow its teachings.

Referring now to the drawings, the ribbed underground storage basin or tank incorporating the features of the present invention is generally referred to by the reference numeral 10. Tank 10 includes an upper end 12, a lower end 14, and a generally conical tapered bottom section 16. A raised annular collar 18 generally defines the interface between lower end 14 and tapered section 16. Tank 10 includes a generally cylindrical side wall 20, and the diameter of collar 18 is greater than the diameter of side wall 20.

Figure 4:
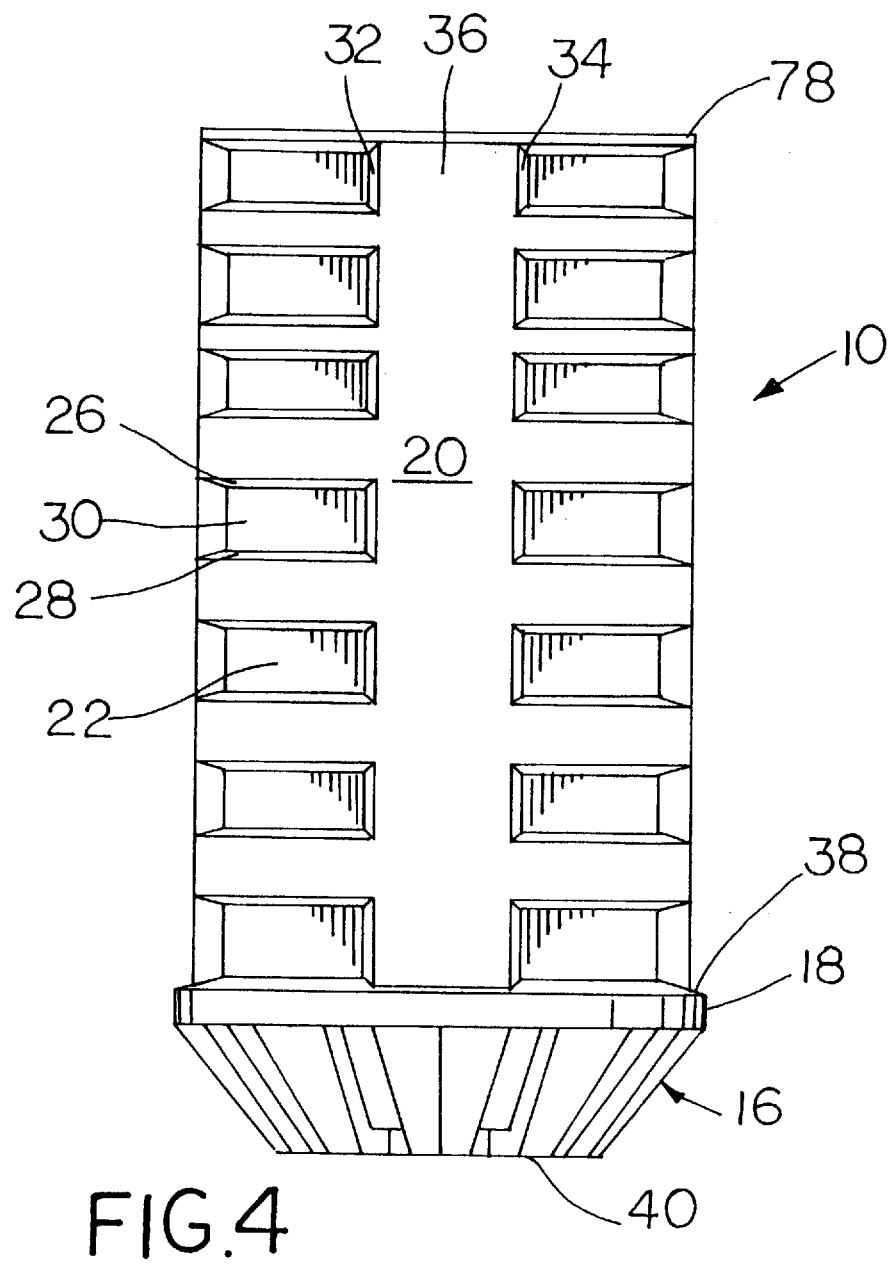
FIG. 4 is an elevational view of the ribbed storage tank shown in FIGS. 1 through 3.
Figure 6:
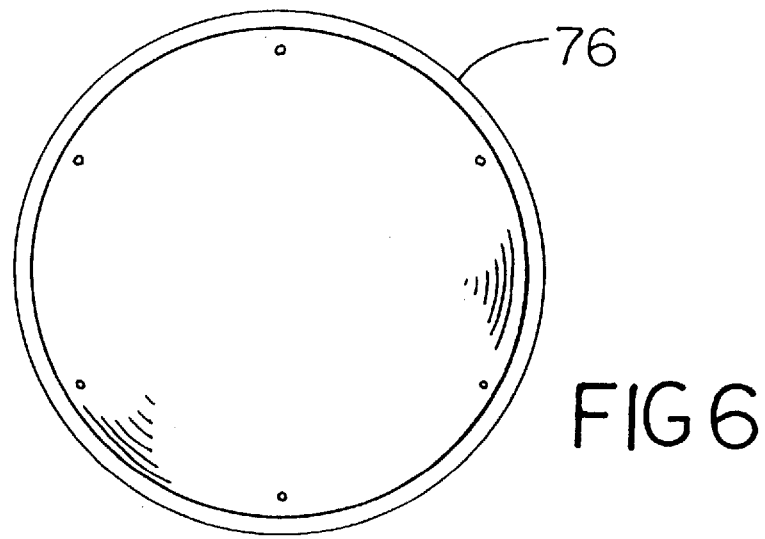
FIG. 6 is a top plan view taken along lines 6—6 of FIG. 4 illustrating the removable access cover.

Sidewall 20 includes a plurality of annular ribs 22 which are spaced circumferentially about side wall 20 and which are separated by a plurality of longitudinal ribs 24 which are also spaced circumferentially about side wall 20 and which separate annular ribs 22. Each annular rib 22 includes a top flange 26, a bottom flange 28 and an interconnecting web 30. Similarly, as can be seen in FIG. 4, each longitudinal rib 24 includes a pair of side flanges 32, 34 and an interconnecting web 36. Web 36 of longitudinal ribs 24 is generally coextensive with side wall 20. Collar 18 includes a generally upwardly facing surface 38, which provides a resting area for dirt, gravel or other back fill so that surface 38 and along with bottom flanges 28 of annular ribs 22 help to maintain tank 10 within the ground and resist the uplifting forces caused by hydrostatic pressure.

Figure 3:
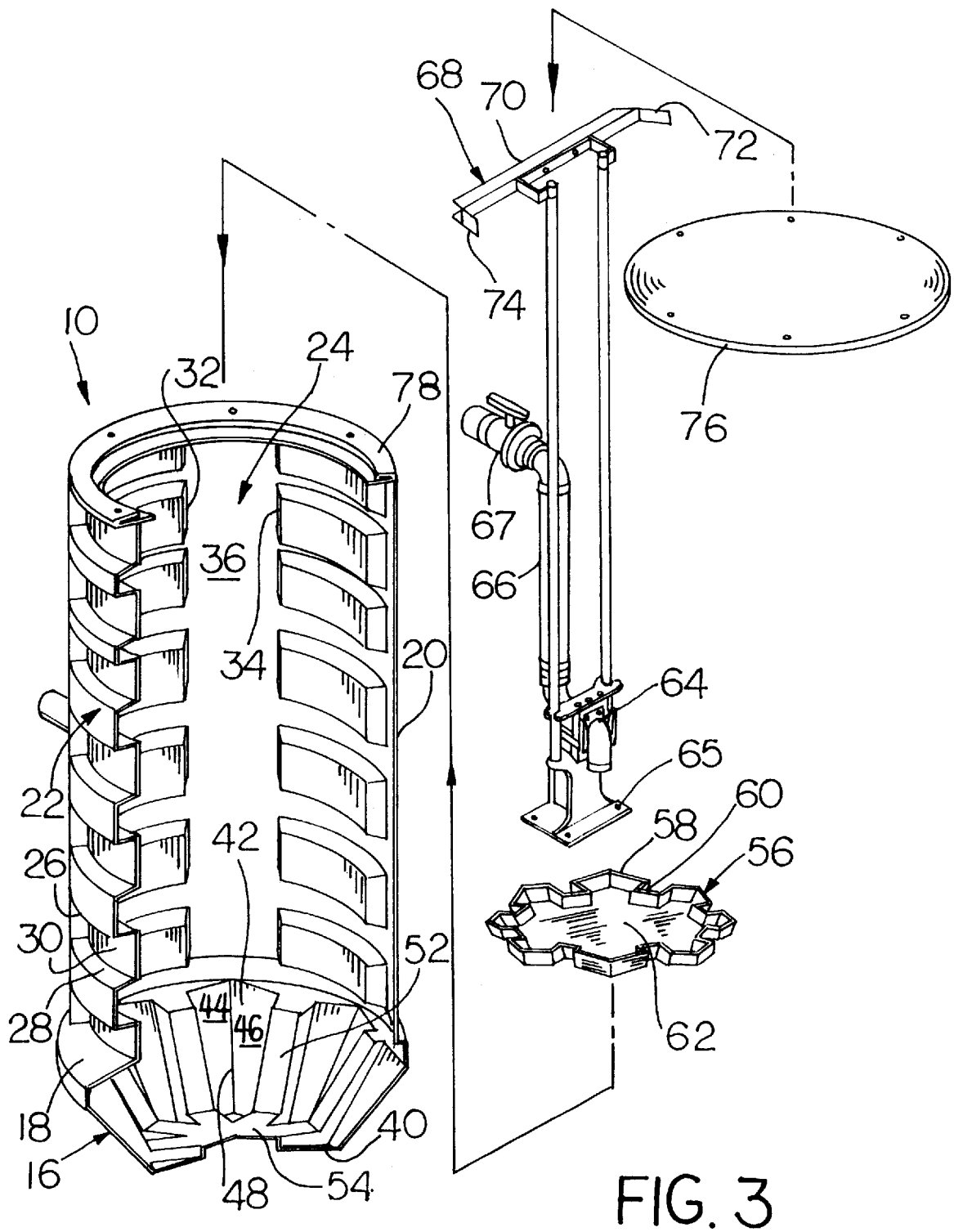
FIG. 3 is a fragmentary exploded view in perspective of the present ribbed storage tank showing the floor insert, the access cover, and equipment for mounting within the tank.
Figure 5:
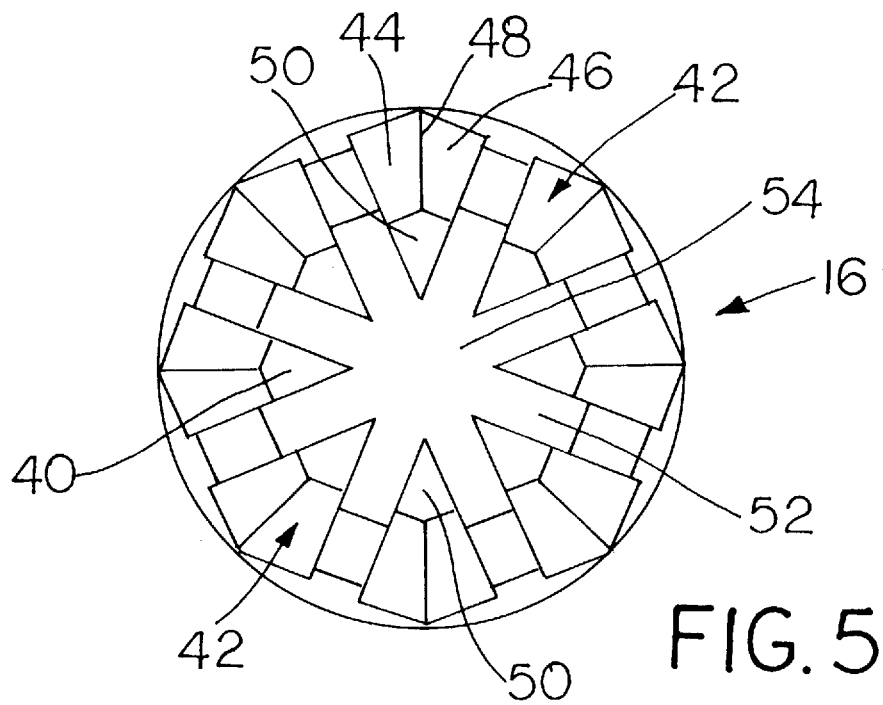
FIG. 5 is bottom plan view taken along lines 5—5 of FIG. 4 illustrating the shape of the tapered bottom portion of the tank.

Referring now to FIGS. 3–5, tapered section 16 extends from collar 18 and terminates in a generally flat bottom support surface 40. As shown to advantage in FIGS. 3 and 5, bottom section 16 includes a plurality of supporting columns or posts 42, each of which has a pair of generally planer surfaces 44, 46 separated by a fold or seam 48 which adds stiffness to each post 42. Surfaces 44 and 46 of each post 42 converge and terminate in a generally triangular ground support pad. A plurality of intersecting channel shaped ribs 52 separate each post 42, and provide an avenue for ground water to flow underneath the ground support surface 40. The upper surface of ribs 52 define a floor 54 on the interior of tank 10. As shown in FIG. 3, a floor insert 56 fits inside tank 10 and rests on floor 54. Insert 56 includes a plurality of angled points 58 and a plurality of indentations 60. Points 58 engage the inner surfaces posts 42, while indentations 60 engage the inner surfaces of ribs 52, which serves to lock insert 56 in place and which prevents any movement of the insert 56 relative to the tank 10. Insert 56 includes a support surface 62 which serves as an attachment point for mounting bracket 65, to which is mounted accessories such as a pump 64, piping 66, or other accessories commonly employed in the art. Support surface 62 of insert 56 enables the user to firmly attach the accessories within the tank 10 without drilling holes through the sidewall 20 or the support surface 40, and accordingly a potential source of leakage is eliminated. Piping 66 typically must penetrate sidewall 20, which is preferably done by drilling a hole through the sidewall 20 through the web 36 of one of the longitudinal ribs 24. A sealed coupling 67 or similar means is typically provided in order to maintain a seal between the piping 66 and the sidewall 20. An upper support bracket 68 includes a central portion 70 and a pair of ends 72, 74. Ends 72, 74 are sized to engage the inner surface of sidewall 20 and may be glued, bonded or otherwise secured to sidewall 20 by commercially available adhesives. Alternatively, ends 72, 74 may be mounted in between adjacent annular ribs 22 in a similar manner. A removable access hatch or cover 76 is secured to the top rim 78 using mounting bolts as is common industry practice.

In operation, the tank 10 is typically supported on a concrete base 80 which has been poured or placed well below the ground level 82. The area surrounding the tank 10 is typically backfilled using pea gravel 84 or similar aggregate such as sand, dirt, and other materials commonly employed in the industry. The downward gravitational force of the gravel 84 against the raised collar 18 and the flanges 28 of ribs 22 prevent the commonly occurring problem of hydrostatic lift-off. Insert 56 is placed within the tank 10 adjacent the tapered bottom section 16, with the points 58 in engagement with the inner surfaces posts 42 and with the indentations 60 in engagement with the inner surfaces of ribs 52. Mounting bracket 65 as well as the pump 64 and piping 66 can be secured to insert 56 either before or after insert 56 is positioned within tank 10. After bracket 68 has been secured, cover 76 is secured to the top of tank 10, thus sealing the tank and securing the contents.

It is understood that the above description does not limit the invention to the above-given details, but may be modified within the scope of the following claims.

What is claimed:

1. An underground storage tank for placement in the ground for receiving, temporarily holding, and discharging effluent, said tank comprising:
    a top end, a bottom end, and a generally cylindrical interconnecting sidewall, said sidewall including a plurality of annular ribs integrally formed into said sidewall, said sidewall and said annular ribs defining a plurality of longitudinal ribs spaced circumferentially about said sidewall;
    a tapered portion extending from said bottom end, said tapered portion being separated from said sidewall by a raised annular collar, the diameter of said collar being greater than the diameter of said sidewall;
    said tapered portion terminating in a ground support surface, said tapered portion further including a plurality of base ribs; and
    a floor insert having an equipment mounting surface for placement inside said tank adjacent said tapered portion, said insert engaging and interlocking with a portion of said tapered portion to thereby support said insert at a distance spaced from said ground support surface to permit accessories to be mounted to said insert without drilling holes through said tank.

2. The tank as claimed in claim 1, wherein a portion of said sidewall defines an attachment surface to permit the attachment of accessories to said sidewall.

3. The tank as claimed in claim 1, wherein a portion of at least one of said longitudinal ribs defines an attachment surface to permit the attachment of accessories to said sidewall.

4. The tank as claimed in claim 1, wherein said annular ribs include top and bottom flanges and an interconnecting web.

5. The tank as claimed in claim 1, wherein said longitudinal ribs include a pair of side flanges and an interconnecting side web.

6. The tank as claimed in claim 1, wherein said longitudinal ribs include a web, said longitudinal rib web being generally coextensive with said sidewall.

7. The tank as claimed in claim 1, wherein said annular ribs protrude inwardly from said sidewall.

8. The tank as claimed in claim 7, wherein said annular ribs include a web and a pair of flanges, said annular rib flanges and said annular collar defining anchor means for anchoring said tank in the ground.

9. The tank as claimed in claim 1, wherein said annular ribs are spaced circumferentially about said sidewall.

10. The tank as claimed in claim 1, wherein said tapered portion includes a plurality of inclined support posts, and said ground support surface includes a plurality of ground support pads, each of said support posts terminating in a said ground support pad.

11. The tank as claimed in claim 10, wherein said support posts extend between said annular collar and said ground support surface.

12. The tank as claimed in claim 11, wherein each of said support posts include a pair of generally outwardly facing planar surfaces, said planar surfaces being separated by a reinforcing seam.

13. The tank as claimed in claim 10, wherein said support posts taper with distance towards said ground support surface.

14. The tank as claimed in claim 10, wherein each of said ground support pads is triangular.

15. The tank as claimed in claim 10, wherein said ground support surface includes a plurality of base ribs, each of said pads being separated one of said base ribs.

16. A molded underground storage tank for placement in the ground for receiving, temporarily holding, and discharging effluent, said tank comprising:
    a top end, a bottom end, and a generally cylindrical interconnecting sidewall, said sidewall including a plurality of annular ribs integrally formed into said sidewall, said sidewall and said annular ribs defining a plurality of longitudinal ribs spaced circumferentially about said sidewall;
    a tapered portion extending from said bottom end, said tapered portion being separated from said sidewall by a raised annular collar, the diameter of said collar being greater than the diameter of said sidewall;
    said tapered portion terminating in a ground support surface, said tapered portion further including a plurality of base ribs; and
    ground anchor means for anchoring said tank in the ground, said means being integrally molded into said sidewall.

17. The tank as claimed in claim 16, including mounting means for mounting accessories to the interior of said tank, said mounting means permitting accessories to be mounted to said tank without drilling holes through said tank.

18. The tank as claimed in claim 17, said mounting means including a floor insert, said floor insert for placement inside said tank adjacent said tapered portion, said insert being adapted to engage and interlocking with a portion of said tapered portion to thereby support said insert at a distance spaced from said ground support surface.

19. The tank as claimed in claim 16, wherein a portion of said sidewall defines an attachment surface to permit the attachment of accessories to said sidewall.

20. The tank as claimed in claim 16, wherein a portion of at least one of said longitudinal ribs defines an attachment surface to permit the attachment of accessories to said sidewall.

21. The tank as claimed in claim 16, wherein said annular ribs include top and bottom flanges and an interconnecting web.

22. The tank as claimed in claim 16, wherein said longitudinal ribs include a pair of side flanges and an interconnecting side web.

23. The tank as claimed in claim 16, wherein said longitudinal ribs include a web, said longitudinal rib web being generally coextensive with said sidewall.

24. The tank as claimed in claim 16, wherein said annular ribs protrude inwardly from said sidewall.

25. The tank as claimed in claim 24, wherein said ground anchor means includes an annular collar.

26. The tank as claimed in claim 25, wherein said annular ribs include a web and a pair of flanges, said ground anchor means further includes said annular rib flanges.

27. The tank as claimed in claim 16, wherein said annular ribs are spaced circumferentially about said sidewall.

28. The tank as claimed in claim 16, wherein said tapered portion includes a plurality of inclined support posts, and said ground support surface includes a plurality of ground support pads, each of said support posts terminating in a said ground support pad.

29. The tank as claimed in claim 28, wherein said support posts extend between said annular collar and said ground support surface.

30. The tank as claimed in claim 29, wherein each of said support posts include a pair of generally outwardly facing planar surfaces, said planar surfaces being separated by a reinforcing seam.

31. The tank as claimed in claim 28, wherein said support posts taper with distance towards said ground support surface.

32. The tank as claimed in claim 28, wherein each of said ground support pads is triangular.

33. The tank as claimed in claim 28, wherein said ground support surface includes a plurality of base ribs, each of said pads being separated one of said base ribs.

* * * * *